United States Patent
Samson et al.

(10) Patent No.: US 9,142,001 B2
(45) Date of Patent: *Sep. 22, 2015

(54) PERFORMANCE ALLOCATION METHOD AND APPARATUS

(71) Applicant: Intel Corporation, Santa Clara, CA (US)

(72) Inventors: Eric Samson, Folsom, CA (US); Murali Ramadoss, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,523

(22) Filed: Feb. 28, 2013

(65) Prior Publication Data

US 2013/0229420 A1 Sep. 5, 2013

Related U.S. Application Data

(63) Continuation of application No. 13/469,395, filed on May 11, 2012, now Pat. No. 8,411,095, which is a continuation of application No. 12/157,479, filed on Jun. 11, 2008, now Pat. No. 8,199,158.

(51) Int. Cl.
*G06F 15/16* (2006.01)
*G06F 15/00* (2006.01)
(Continued)

(52) U.S. Cl.
CPC .............. *G06T 1/00* (2013.01); *G06F 1/3203* (2013.01); *G06F 1/324* (2013.01); *G06F 9/50* (2013.01); *G06T 1/20* (2013.01); *G09G 5/001* (2013.01); *G09G 5/363* (2013.01); *G06F 11/348* (2013.01); *G06F 11/3409* (2013.01); *G09G 2330/021* (2013.01); *Y02B 60/1217* (2013.01); *Y02B 60/142* (2013.01); *Y02B 60/165* (2013.01)

(58) Field of Classification Search
CPC .................... G06T 1/00–1/0092; G06F 15/00; G06F 15/16–15/161; G06F 13/14
USPC ................................... 345/501, 502, 504, 519
See application file for complete search history.

(56) References Cited

U.S. PATENT DOCUMENTS 6,971,034 B2   11/2005  Samson et al.
7,149,909 B2 *  12/2006  Cui et al. ...................... 713/322
(Continued)

FOREIGN PATENT DOCUMENTS

CN         1938671 A    3/2007
JP      2007-503059 A   2/2007
(Continued)

OTHER PUBLICATIONS

"Invitation pursuant to Rule 62a(1) EPC: Office Action", mailed Apr. 23, 2010 for European Application No. 09251531.1-2205, 2pgs.

(Continued)

*Primary Examiner* — Jacinta M Crawford
(74) *Attorney, Agent, or Firm* — Trop, Pruner & Hu, P.C.

(57) ABSTRACT

In accordance with some embodiments, a graphics process frame generation frame rate may be monitored in combination with a utilization or work load metric for the graphics process in order to allocate performance resources to the graphics process and in some cases, between the graphics process and a central processing unit.

13 Claims, 3 Drawing Sheets

(51) Int. Cl.

| | |
|---|---|
| G06T 1/00 | (2006.01) |
| G06F 1/32 | (2006.01) |
| G06F 9/50 | (2006.01) |
| G06T 1/20 | (2006.01) |
| G09G 5/00 | (2006.01) |
| G09G 5/36 | (2006.01) |
| G06F 11/34 | (2006.01) |

(56) References Cited

U.S. PATENT DOCUMENTS

| | | | |
|---|---|---|---|
| 7,222,253 B2 | 5/2007 | Samson et al. | |
| 7,268,779 B2 | 9/2007 | Piazza et al. | |
| 7,698,575 B2 | 4/2010 | Samson | |
| 7,711,864 B2* | 5/2010 | de Cesare et al. | 710/8 |
| 7,898,545 B1* | 3/2011 | Alben et al. | 345/519 |
| 7,903,116 B1* | 3/2011 | Klock et al. | 345/501 |
| 7,925,899 B2 | 4/2011 | Gumma et al. | |
| 2003/0222876 A1* | 12/2003 | Giemborek et al. | 345/503 |
| 2004/0039954 A1 | 2/2004 | White et al. | |
| 2004/0125099 A1 | 7/2004 | Stanley et al. | |
| 2005/0223249 A1* | 10/2005 | Samson | 713/320 |
| 2006/0059494 A1 | 3/2006 | Wexler et al. | |
| 2007/0206018 A1 | 9/2007 | Bajic et al. | |
| 2007/0242076 A1 | 10/2007 | Samson et al. | |
| 2009/0027403 A1 | 1/2009 | Jung | |
| 2009/0096797 A1* | 4/2009 | Du et al. | 345/506 |
| 2009/0167770 A1 | 7/2009 | Navale et al. | |
| 2009/0309885 A1 | 12/2009 | Samson et al. | |
| 2010/0162006 A1 | 6/2010 | Therien et al. | |
| 2012/0223954 A1 | 9/2012 | Samson et al. | |

FOREIGN PATENT DOCUMENTS

| | | |
|---|---|---|
| WO | 2005020157 A1 | 3/2005 |
| WO | 2005/098579 A2 | 10/2005 |

OTHER PUBLICATIONS

"Notice of Preliminary Rejection: Office Action and English translation", mailed Feb. 9, 2011, for Korean Patent Application No. 10-2009-51431, 9pgs.

"Communication pursuant to Article 94(3) EPC: Office Action", mailed Nov. 2, 2010, for European Application No. 09251531.1-2205, 7pgs.

Office Action Received for European Patent Application No. 09251531.1, mailed on Nov. 7, 2011, 6 Pages of European Office Action.

Office Action Received for European Patent Application No. 09251531.1, mailed on Apr. 8, 2013, 11 Pages of European Office Action.

Office Action Received for Chinese Patent Application No. 200910145948.5, mailed on Jun. 23, 2011, 5 Pages of Chinese Office Action and 5 Pages of English Translation.

Office Action Received for Chinese Patent Application No. 200910145948.5, mailed on May 18, 2012, 6 Pages of Chinese Office Action and 7 Pages of English Translation.

Office Action Received for Chinese Patent Application No. 200910145948.5, mailed on Aug. 31, 2012, 4 Pages of Chinese Office Action and 6 Pages of English Translation.

Office Action Received for Chinese Patent Application No. 200910145948.5, mailed on Jun. 24, 2013, 3 Pages of Chinese Office Action and 3 Pages of English Translation.

Flautner et al. "Vertigo: Automatic Performance-Setting for Linux", XP002286444, May 17, 2002, pp. 1-14.

Nvidia "Nvidia GPU Programming Guide", XP002599473, Jan. 3, 2006, pp. 1-80.

* cited by examiner

PERFORMANCE ALLOCATION METHOD AND APPARATUS

CROSS-REFERENCE TO RELATED APPLICATIONS

This application is a continuation of U.S. patent application Ser. No. 13/469,395 entitled "PERFORMANCE ALLOCATION METHOD AND APPARATUS" and filed May 11, 2011, which was a continuation of U.S. patent application Ser. No. 12/157,479 entitled "PERFORMANCE ALLOCATION METHOD AND APPARATUS" and filed Jun. 11, 2008. The entire contents of those applications are incorporated herein by reference.

BACKGROUND

The present invention relates generally to computing and in particular to allocating processing resources between core and graphics processing.

With today's and future computing systems such as desktop computers, mobile computers, portable devices such as phones and audio/video players, and the like, it is desirable to consume less power, regardless of whether or not the device is mobile or otherwise. Accordingly, with many devices that include more than one processing unit such as with a core processing unit (e.g., a core within a processor having one or more processing cores) and a graphics processor, performance budgets may be imposed on the processors (or processing units) to reduce overall power consumption. Unfortunately, such approaches can be inefficient and thus, improved solutions may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In accordance with some embodiments, a graphics process frame generation frame rate may be monitored in combination with a utilization or work load metric for the graphics process in order to allocate performance resources to the graphics process and in some cases, between the graphics process and a central processing unit.

Figure 1:
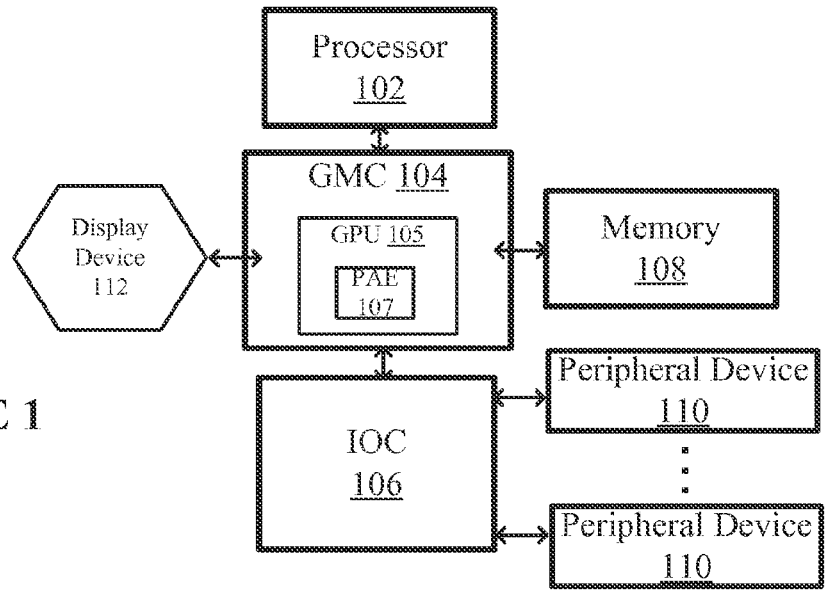
FIG. 1 is a system diagram of a computing system in accordance with some embodiments.

FIG. 1 shows a portion of an exemplary computing system. It comprises a processor 102 (or central processing unit "CPU"), a graphics/memory controller (GMC) 104, an input/output controller (IOC) 106, memory 108, peripheral devices/ports 110, and a display device 112, all coupled together as shown. The processor 102 may comprise one or more cores in one or more packages and functions to facilitate central processing tasks including executing one or more applications.

The GMC 104 controls access to memory 108 from both the processor 102 and IOC 106. It also comprises a graphics processing unit 105 to generate video frames for application(s) running in the processor 102 to be displayed on the display device 112.

The IOC 106 controls access between the peripheral devices/ports 110 and the other blocks in the system. The peripheral devices may include, for example, peripheral chip interconnect (PCI) and/or PCI Express ports, universal serial bus (USB) ports, network (e.g., wireless network) devices, user interface devices such as keypads, mice, and any other devices that may interface with the computing system.

In some embodiments, a performance allocation engine (PAE) 107 is included within the graphics processing unit 105 to allocate performance resources between the graphics processing unit and the processor 102. As will be discussed more below, the PAE monitors the rate at which frames are generated by the GPU, as well as a performance utilization metric (e.g., how busy is it?) to control performance resource allocation for the GPU or between the GPU and processor so as to reduce performance resource consumption by the GPU when less performance, e.g., frequency, is needed. (It should be appreciated that while in the depicted embodiment, a performance allocation engine 107 is included in the GPU, it may alternatively be included in any other or combination of GPU and other computing system blocks. Similarly, it should be appreciated that in the depicted embodiment, graphics, memory and I/O controller functionality are implemented in chips separate from the processor chip, but they may also be implemented in a common chip or common integrated circuit (IC) package with different combinations of each other and thus, the invention is not limited to any particular chip or chip combination.)

Figure 2:
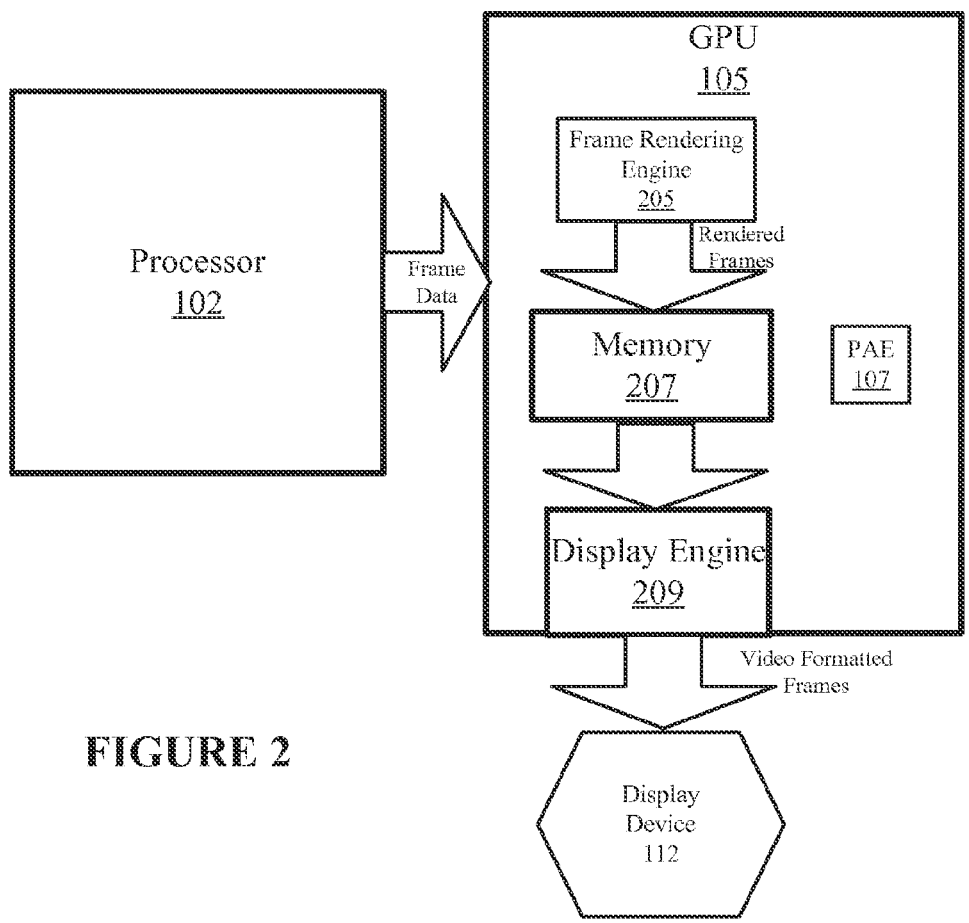
FIG. 2 is a diagram of a portion of a computing system with a performance allocation engine in accordance with some embodiments.

FIG. 2 shows a portion of a computing system, such as the computing system of FIG. 1, with a portion of a GPU 105 having a performance allocation engine 107. Shown in the GPU, apart from the PAE 107, is a frame rendering engine 205, memory 207, and a display engine 209. The GPU 105 receives frame data, e.g., all or in part generated by an application running in the processor 102. The frame rendering engine processes the frame data to generate rendered frames (e.g., files of digital pixel information corresponding to all or part of a video frame) that can be provided to the display device 112. The rendered frames are driven into the memory 207, which serves as a buffer, e.g., first-in-first-out frame buffer, to store the frames so that they can be fed into the display device 112 by the display engine 209.

(It should be appreciated that the frame rendering engine 205, memory 207, and display engine 209 represent functional blocks that may or may not comprise all or parts of other functional units within or external to the GPU 105. For example, the memory 207 may or may not be within the GPU.)

The PAE 107 comprises hardware and or software to allocate performance resources (e.g., frequency) between the GPU 105 and processor 102. For example, it may be implemented as an executable software routine, e.g., in a GPU driver, or it may wholly or partially be implemented with dedicated or shared arithmetic or other logic circuitry. it may comprise any suitable combination of hardware and/or software, implemented in and/or external to a GPU to monitor a rendered frame rate, e.g., instantaneous and/or a moving average frame rate, along with GPU processor utilization (e.g., a measure or indication of how hard the frame rendering engine 205 is working) to control, or otherwise indicate, performance resource allocation for the GPU and/or the processor.

Figure 3:
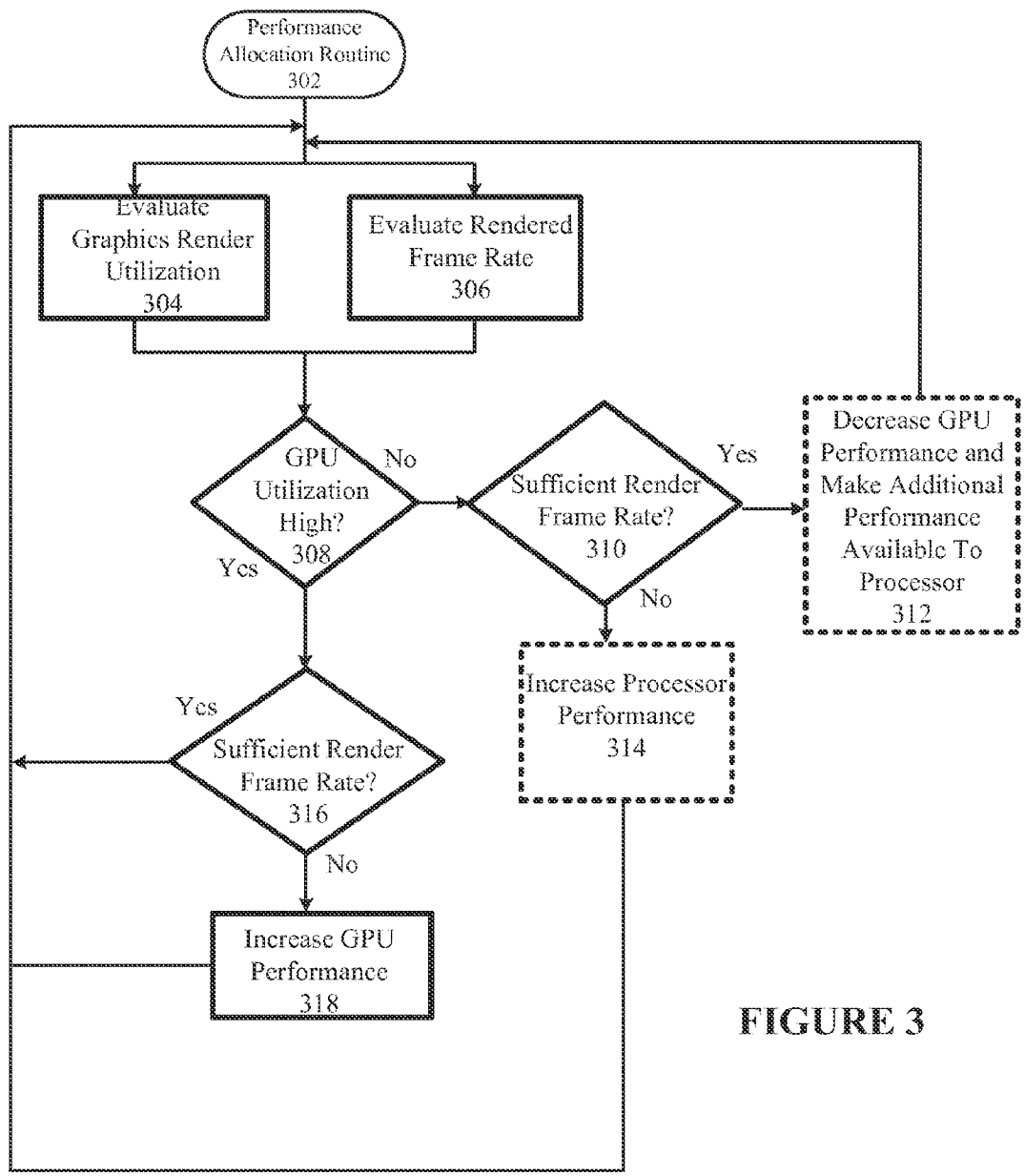
FIG. 3 is a flow diagram of a routine to implement a performance allocation engine in accordance with some embodiments.

FIG. 3 shows an exemplary flow diagram for implementing a performance allocation engine routine 107. However, before discussing it, the graphs of FIGS. 4A to 4D will be described to provide an overview for an understanding of the purposes of the routine of FIG. 3. These graphs show frame rendering performance as a function of CPU and GPU performance, progressively, as relatively increased performance resources are provided to the processor. Each graph includes exemplary average distributions of frame duration for the GPU and processor, i.e., the relative times taken by the processor and GPU to generate frame data and rendered frames, respectively. Thus, as the curves move to the left, and thus frame duration attributable to the GPU and/or processor decrease, the average rendered frame rate increases.

Figure 4A:
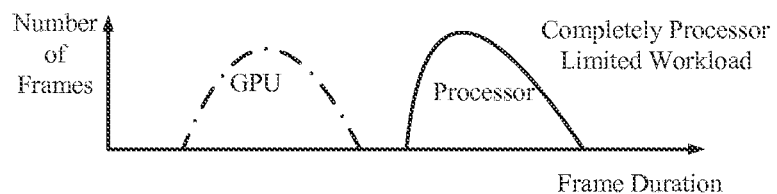
FIGS. 4A-4D graphically show frame rendering performance as a function of CPU and GPU performance, progressively, as relatively increased performance resources are provided to the CPU.
Figure 4B:
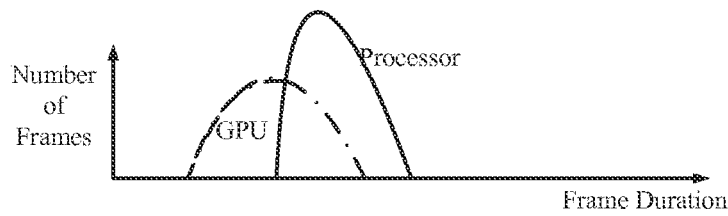
Figure 4C:
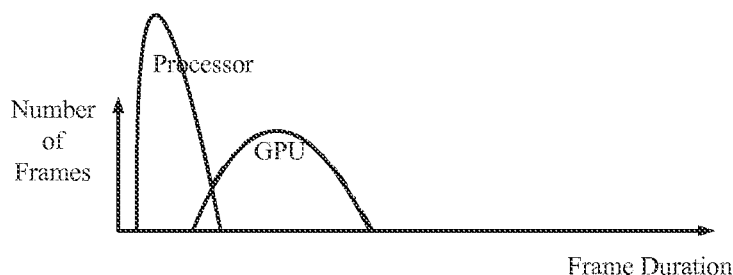
Figure 4D:
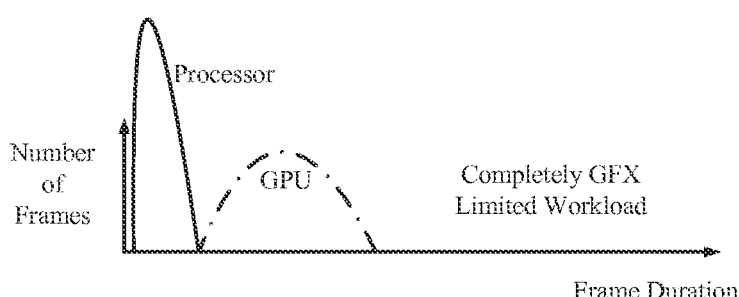

FIG. 4A represents a situation when the frame rate is completely limited by the processor. Moving from graph 4A to 4D, relatively higher performance resources (frequency in this example) are provided to the processor, thereby shifting the processor distribution curve to the left and thus making the overall frame generation rate less limited by the processor. So, it can be seen that if the overall rendered frame rate is processor limited, then it doesn't materially help to increase GPU performance and conversely, when the rendered frame rate is GPU limited, the frame rate is not materially improved by increasing processor performance.

Thus, when rendered frame generation is GPU limited, if the frame rate is not sufficient, GPU performance (and not necessarily processor performance) should be increased. If, however, the frame rate is sufficient, then performance resources can be reduced for the processor and thus, power consumption, for example, may be reduced. Likewise, if it is determined that the frame rate may be processor limited, then if the frame rate is not sufficient, it may be inferred that additional performance resources should be provided to the processor. If, however, the frame rate is deemed to be sufficient, then performance resources may be reduced from the GPU. With this in mind, the flow diagram of FIG. 3 will be discussed.

FIG. 3 shows a performance allocation engine routine 302 in accordance with some embodiments. At 304, the graphics render utilization is evaluated. This, for example, could be done by evaluating utilization in a frame rendering engine such as frame rendering utilization 205 in the GPU 105. Utilization is a measure of how hard the rendering engine is working. It may be as simple as whether or not relevant processing units are active or idle, or it could be a more quantitative measure of the extent to which relevant GPU units are performing.

At 306, the rendered frame rate is evaluated (or monitored). This involves determining the rate at which rendered frames are being generated, e.g., by a frame rendering engine. For example, within the GPU (or even external to it), one or more signals indicative of whether a new frame is being provided to memory (e.g., memory 207) could be monitored to measure or estimate the times between generated frames.

The frame rate used in the routine may be an instantaneous estimate, an average, a moving average with a desired window size (number of frames), or a combination of such rates. In some embodiments, a weighted average may be used to filter out anomalies. For example, weight values adding up to one could be employed for different adjacent frame durations to calculate a running average. The number of weight values adding up to one would correspond to the number of frames in the moving window. Depending on the sampling rate used to measure frame durations, the values could be adjusted to achieve acceptable results.

As an example, with an assumed sampling rate of 200 samples-per-second and a desired moving average window width of 5 seconds with two frames in the window, a first weighting constant, $a_1$, of $1/30000$ and a second weighting constant, $a_2$, of 2999/30000 could be used. The MOVING AVERAGE frame rate would then be calculated as:

$$FR = 1/(a_1 * F_d[n-1] + a_2 * F_d)$$

where $F_d[n-1]$ is the duration of the first frame in a window and $F_d$ is the duration of the next frame in the window. Of course, any suitable or otherwise desired weighting scheme or numbers of frames per window could be utilized.

At 308, it is determined if GPU utilization is high. If it is not high (e.g., normal or low), then at 310, the routine determines if the rendered frame rate is sufficient. If the frame rate is not sufficient (implying that GPU performance is sufficient but processor performance is insufficient), then at 314, the processor performance may be increased. (Note that a dashed box is used here, and elsewhere in this figure, to indicate that control of the processor performance may not be available to the PAE, so it may either control or otherwise indicate that the processor performance should be increased.) On the other hand, if the frame rate at 310 is sufficient, then at 312, the GPU performance is decreased and additional performance is allocated to the processor. From either 312 or 314, the routine loops back to 304 and 306 as shown.

Returning to 308, if the GPU utilization is high, then the routine proceeds to 316 and determines if the rendered frame rate is sufficient (e.g., in the same way as at 310). If the frame rate is sufficient, then the routine loops back to 304 and 306 and proceeds as discussed. On the other hand, if the frame rate is not sufficient (implying that the frame rate is GPU limited), then at 318, the GPU performance is increased (e.g., frequency is increased), and the routine loops back to 304 and 306 and proceeds as discussed.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

One example embodiment may be one non-transitory computer-readable medium having instructions stored therein that when the instructions are executed on a machine cause the machine to determine a frame rate value associated with a rate at which the graphics processor is rendering frames, determine a workload value associated with an activity level of the graphics processor that when (i) the workload value is above a threshold value and (ii) the frame rate is below a threshold rate, add performance resources to the graphics processor and when (i) the workload value is below the threshold value and (ii) the frame rate is below the threshold rate, add performance resources to the central processor without adding performance resources to the graphics processor.

What is claimed is:

1. An apparatus, comprising:
   a graphics processing unit (GPU) to receive data from a processor and, based on the received data, to generate rendered frames;
   circuitry to monitor a rate that frames are rendered and utilization of the GPU, wherein, based on the rate and the GPU utilization, the circuitry to increase a frequency of the processor; and
   wherein, based on the rate exceeding a threshold rate value and the GPU utilization falling below a threshold utilization value, the circuitry to increase the frequency of the processor and to reduce a frequency of the GPU.

2. The apparatus of claim 1, wherein the GPU includes a plurality of processing units, and wherein to monitor utilization of the GPU comprises determining whether one or more of the plurality of processing units are active.

3. The apparatus of claim 1, further comprising memory to store the rendered frames.

4. The apparatus of claim 1, further comprising:
   memory to store the rendered frames; and
   a display engine to access the rendered frames in the memory.

5. The apparatus of claim 1, further comprising a display device to receive the rendered frames from a display engine.

6. A method, comprising:
   receiving data from a processor at a graphics processing unit (GPU);
   generating, at the GPU, rendered frames based on the received data;
   monitoring a rate at which the GPU generates the rendered frames;
   monitoring utilization of the GPU;
   increasing a frequency of the processor in response to the rate falling below a threshold rate value and the GPU utilization exceeding a threshold utilization value, the GPU utilization comprising an extent to which processing units of the GPU are active; and
   increasing the frequency of the processor and reducing a frequency of the GPU based on the rate exceeding the threshold rate value and the GPU utilization falling below the threshold utilization value.

7. The method of claim 6, further comprising increasing the frequency of the processor based on the rate falling below the threshold rate value and the GPU utilization falling below the threshold utilization value.

8. The method of claim 6, wherein monitoring utilization of the GPU comprises determining whether one or more of the processing units of the GPU are active.

9. The method of claim 6, further comprising:
   storing the rendered frames in a memory;
   accessing the rendered frames in the memory; and
   providing the rendered frames from a display engine to a display device.

10. At least one non-transitory machine readable medium having stored thereon one or more instructions that, when executed by an apparatus, causes the apparatus to:
    receive, at a graphics processing unit (GPU), data from a processor;
    generate rendered frames at the GPU based on the received data;
    monitor a rate at which the GPU generates the rendered frames;
    monitor utilization of the GPU;
    increase a frequency of the processor based on the rate falling below a threshold rate value and the GPU utilization exceeding a threshold utilization value, the GPU utilization comprising an extent to which processing units of the GPU are active; and
    increase the frequency of the processor and reduce a frequency of the GPU based on the rate exceeding the threshold rate value and the GPU utilization falling below the threshold utilization value.

11. The at least one machine readable medium of claim 10, further having stored thereon one or more instructions that, when executed by the apparatus, causes the apparatus to increase the frequency of the processor based on the rate falling below the threshold rate value and the GPU utilization falling below the threshold utilization value.

12. The at least one machine readable medium of claim 10, wherein the one or more instructions that, when executed by the apparatus, cause the apparatus to monitor utilization of the GPU which comprises causing the apparatus to determine whether one or more of the processing units of the GPU are active.

13. The at least one machine readable medium of claim 10, further having stored thereon one or more instructions that, when executed by the apparatus, causes the apparatus to:
   store the rendered frames in a memory;
   access the rendered frames in the memory; and
   provide the rendered frames from a display engine to a display device.

\* \* \* \* \*